Feb. 10, 1948.  A. C. WERNER  2,435,857
LOCKING DEVICE FOR TRAILER HITCHES
Filed Oct. 2, 1946
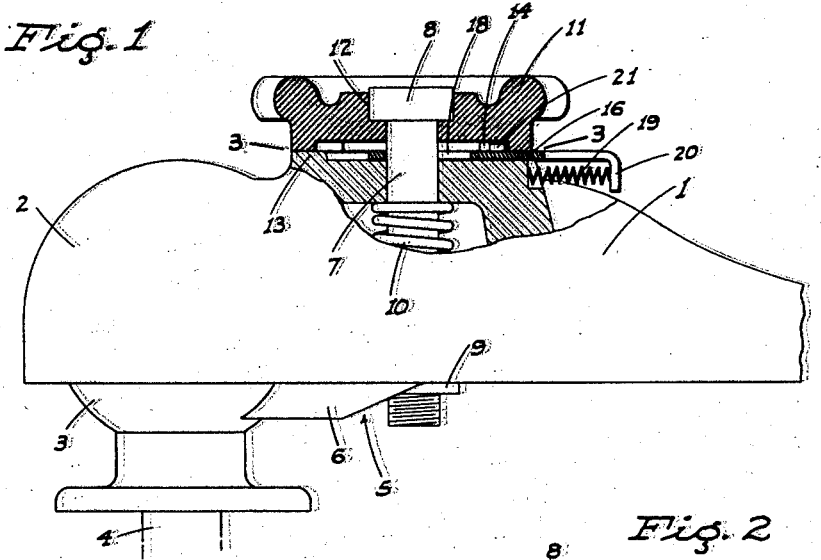
Fig. 1
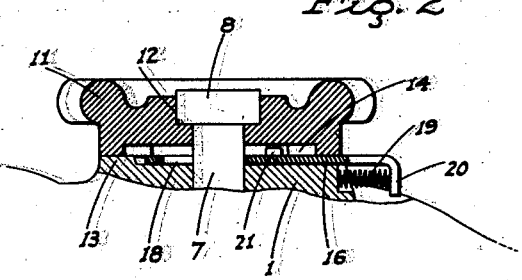
Fig. 2
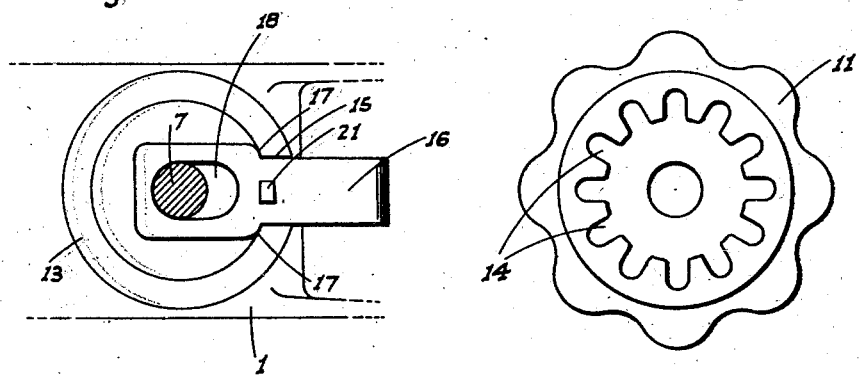
Fig. 3
Fig. 5
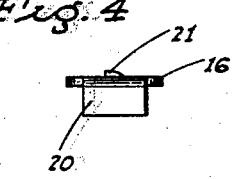
Fig. 4
INVENTOR.
Arthur C. Werner
BY
ATTYS Patented Feb. 10, 1948

2,435,857

UNITED STATES PATENT OFFICE 2,435,857

LOCKING DEVICE FOR TRAILER HITCHES

Arthur C. Werner, Lodi, Calif., assignor to Lloyd H. Lukens, Lodi, Calif.

Application October 2, 1946, Serial No. 700,772

5 Claims. (Cl. 280—33.17)

This invention relates to, and it is an object to provide, an improved locking device for trailer hitches of the type which include a ball engaged in a socket and a holding dog unit adjustably and releasably maintaining the ball and socket against separation; the locking device normally preventing accidental unlocking of the holding dog unit and undesirable resultant separation of the ball and socket.

Another object of the invention is to provide a locking device, as in the preceding paragraph, for a trailer hitch wherein the holding dog unit is adjustable and releasable by a small hand wheel running on the body part of the hitch which includes the socket. The locking device comprises a circular internal ratchet on the hand wheel, and a spring-urged slide mounted on said body part adjacent the circular ratchet and intersecting the same for radial sliding movement relative thereto; the slide carrying a fixed pawl normally cooperating with the ratchet to prevent the hand wheel from rotating in a direction to loosen the holding dog unit, and the pawl being releasable by manual movement of the slide to shift said pawl clear of the ratchet.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, partly in section, showing the locking device as incorporated in a ball and socket type trailer hitch; said device being shown in its normal or locked position.

Fig. 2 is a fragmentary sectional elevation of the locking device, as in Fig. 1, but shows such device in its unlocked position.

Fig. 3 is a sectional plan on line 3—3 of Fig. 1.

Fig. 4 is an outer end view of the slide and included pawl, detached.

Fig. 5 is a bottom plan view of the hand wheel illustrating the circular internal ratchet.

Referring now more particularly to the characters of reference on the drawings, the invention is here shown as embodied in a ball and socket type trailer hitch which includes an elongated body 1 adapted for connection in a conventional manner with the tongue of a trailer; the body 1 being formed at its forward end with a downwardly opening socket 2 for the reception, in matching relation, of a ball 3. The ball 3 is formed with a neck 4 adapted to be coupled to the towing vehicle.

The ball 3 is normally maintained in the socket 2 by means of a holding dog unit, indicated generally at 5, which unit includes a releasable dog 6 bearing against the ball 3 on one side of the latter, and said dog 6 is vertically adjustable into cooperative relation with said ball 3, to prevent its escape from the socket 2, by means of a vertical adjustment bolt 7.

The vertical adjustment bolt 7 is formed, at its upper end, with a non-circular head 8, and thence extends downwardly through the top portion of the body 1 rearwardly of the socket 2, and passes through the dog 6. A nut 9 is threaded on the bolt 7 and is disposed in non-turnable engagement relative to the dog 6. A compression spring 10 surrounds the bolt 7 between the dog 6 and the part of the body 1 through which said bolt projects.

Upon rotation of the bolt 7 in one direction or the other, the dog 6 is thus tightened or loosened relative to the ball 3.

A relatively small hand wheel 11 is disposed above and in engagement with the top of the body 1 and the bolt 7 passes axially through such hand wheel; the latter including a socket 12 in which the non-circular head 8 relatively non-rotatably seats. With this arrangement, rotation of the hand wheel 11 causes corresponding rotation of the bolt 7 to tighten or loosen the dog 6.

When the hand wheel 11 is set to a position for proper tightening of the dog 6 relative to the ball 3, it is requisite that a locking device be provided for the hand wheel 11, in order that the hitch parts remain locked against separation when the hitch is in use.

The locking device, which is the essence of the present invention, comprises the following structural arrangement:

The top of the body 1, directly beneath the hand wheel 11, is formed with an annular supporting shoulder 13, against which the hand wheel 11 bears at and adjacent its periphery.

Radially inwardly of these bearing portions the hand wheel 11, is formed with a circular internal ratchet 14, the inside diameter of which is concentric to but substantially greater than the diameter of the bolt 7, whereby to leave clearance therebetween.

The annular supporting shoulder 13 is radially slotted, as at 15, and a flat slide 16 extends through the slot 15 inwardly of the annular support 13. The slide 16 increases in width to form outwardly facing stop shoulders 17 which normally bear against the annular supporting shoulder 13. The inner end, and increased width portion, of the slide 16 is formed with an elongated opening 18 through which the bolt 7 passes; said bolt normally being disposed in the inner end of said elongated opening.

The slide 16 is normally maintained in such position by means of a compression spring 19 engaged between the body 1 and a down-turned lip 20 on the outer end of the slide 16; said spring being disposed substantially parallel to said slide.

A pawl 21 is fixed on and upstands from the slide 16 in position to normally engage against one of the teeth of the circular internal ratchet 14.

As shown in Fig. 4, the pawl 21 is formed with an abutment in one direction and an inclined face in the other direction, and is positioned so that the ratchet 14 may run over said pawl, by riding up said inclined face, when the hand wheel 11 is turned in a direction to tighten the dog 6. However, the abutment of the pawl 21 normally prevents rotation of the hand wheel in an opposite direction.

When it is desired to turn the hand wheel in such opposite direction, i. e., for the purpose of unloosening the dog 6 and separation of the ball 3 from the socket 2, the slide 16 is first pushed radially inwardly by hand, against the compression of spring 19. This shifts the pawl 21 from its normal position in engagement with the circular internal ratchet 14, to a free position radially inwardly of such ratchet. Thereafter, with the slide 16 shifting radially inwardly, the hand wheel 11 may be freely turned in a direction to unloosen the dog 6.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A locking device for a trailer hitch which includes a hand wheel turnably mounted on a body part and an adjustment bolt extending axially from the hand wheel through the body part, said locking device comprising a circular internal ratchet on the hand wheel adjacent said body part, an annular supporting shoulder included in said body part concentric to the hand wheel axis, the hand wheel bearing against said annular shoulder and the internal ratchet being exposed radially inwardly thereof, a slide extending through the annular shoulder for motion radially of and adjacent the ratchet but fixed circumferentially of the latter, and a holding pawl on the slide normally engaged with the ratchet but releasable therefrom upon radial shifting of the slide in an inward direction.

2. A locking device for a trailer hitch which includes a hand wheel turnably mounted on a body part and an adjustment bolt extending axially from the hand wheel through the body part, said locking device comprising a circular internal ratchet on the hand wheel adjacent said body part, an annular supporting shoulder included in said body part concentric to the hand wheel axis, the hand wheel bearing against said annular shoulder and the internal ratchet being exposed radially inwardly thereof, a slide extending through the annular shoulder for motion radially of and adjacent the ratchet but fixed circumferentially of the latter, and a holding pawl on the slide normally engaged with the ratchet but releasable therefrom upon radial shifting of the slide in an inward direction; the slide including an elongated opening therein radially inwardly of the ratchet, and the bolt extending through said opening.

3. A locking device for a trailer hitch which includes a hand wheel turnably mounted on a body part and an adjustment bolt extending axially from the hand wheel through the body part, said locking device comprising a circular internal ratchet on the hand wheel adjacent said body part, an annular supporting shoulder included in said body part concentric to the hand wheel axis, the hand wheel bearing against said annular shoulder and the internal ratchet being exposed radially inwardly thereof, a slide extending through the annular shoulder for motion radially of and adjacent the ratchet but fixed circumferentially of the latter, and a holding pawl on the slide normally engaged with the ratchet but releasable therefrom upon radial shifting of the slide in an inward direction, there being a spring urging the slide radially outwardly, and a stop on the slide limiting outward motion thereof.

4. A locking device for a trailer hitch which includes a hand wheel turnably mounted on a body part and an adjustment bolt extending axially from the hand wheel through the body part, said locking device comprising a circular internal ratchet on the hand wheel adjacent said body part, an annular supporting shoulder included in said body part concentric to the hand wheel axis, the hand wheel bearing against said annular shoulder and the internal ratchet being exposed radially inwardly thereof, a slide extending through the annular shoulder for motion radially of and adjacent the ratchet but fixed circumferentially of the latter, and a holding pawl on the slide normally engaged with the ratchet but releasable therefrom upon radial shifting of the slide in an inward direction, there being a spring urging the slide radially outwardly, and a stop on the slide limiting outward motion thereof, said stop being a shoulder on the slide bearing against the annular shoulder which supports the hand wheel.

5. A locking device for a trailer hitch which includes a hand wheel turnably mounted on a body part with its under face in contact with such body part, and an adjustment bolt extending axially from the hand wheel and through the body part; said locking device comprising a socket formed in the under face of the hand wheel, ratchets formed in the peripheral wall of the socket, a slide projecting radially of the axis of the wheel and being movable radially between the body part and under face of the wheel and fixed against circumferential movement relative to the wheel, and a holding pawl on the slide projecting into the socket and engageable with the ratchets.

ARTHUR C. WERNER.

REFERENCES CITED

The following references are of record in the file of this patent:

UNITED STATES PATENTS

| Number | Name | Date |
|---|---|---|
| 1,909,917 | Hover | May 16, 1933 |
| 2,189,710 | Draeger | Feb. 6, 1940 |
| 2,265,850 | Martin | Dec. 9, 1941 |
| 2,355,695 | Atwood | Aug. 15, 1944 |
| 2,397,001 | Goodwin | Mar. 19, 1946 |

FOREIGN PATENTS

| Number | Country | Date |
|---|---|---|
| 460,462 | Great Britain | Jan. 28, 1937 |